Figure 1:
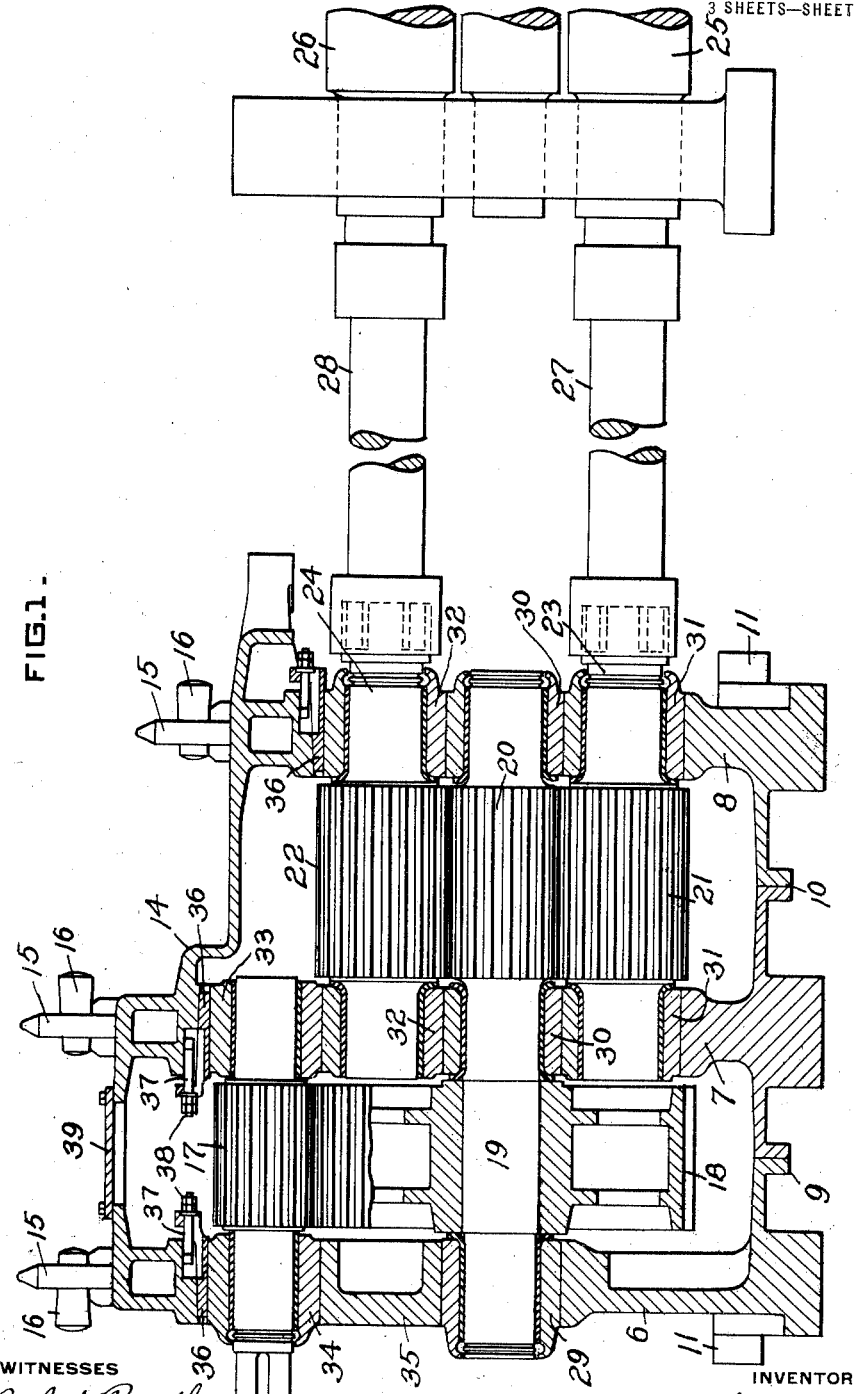

L. IVERSEN.
GEAR DRIVE FOR ROLLING MILLS.
APPLICATION FILED AUG. 15, 1917.

1,401,260. Patented Dec. 27, 1921.
3 SHEETS—SHEET 1.

WITNESSES
J. Herbert Bradley

INVENTOR
Lorenz Iversen

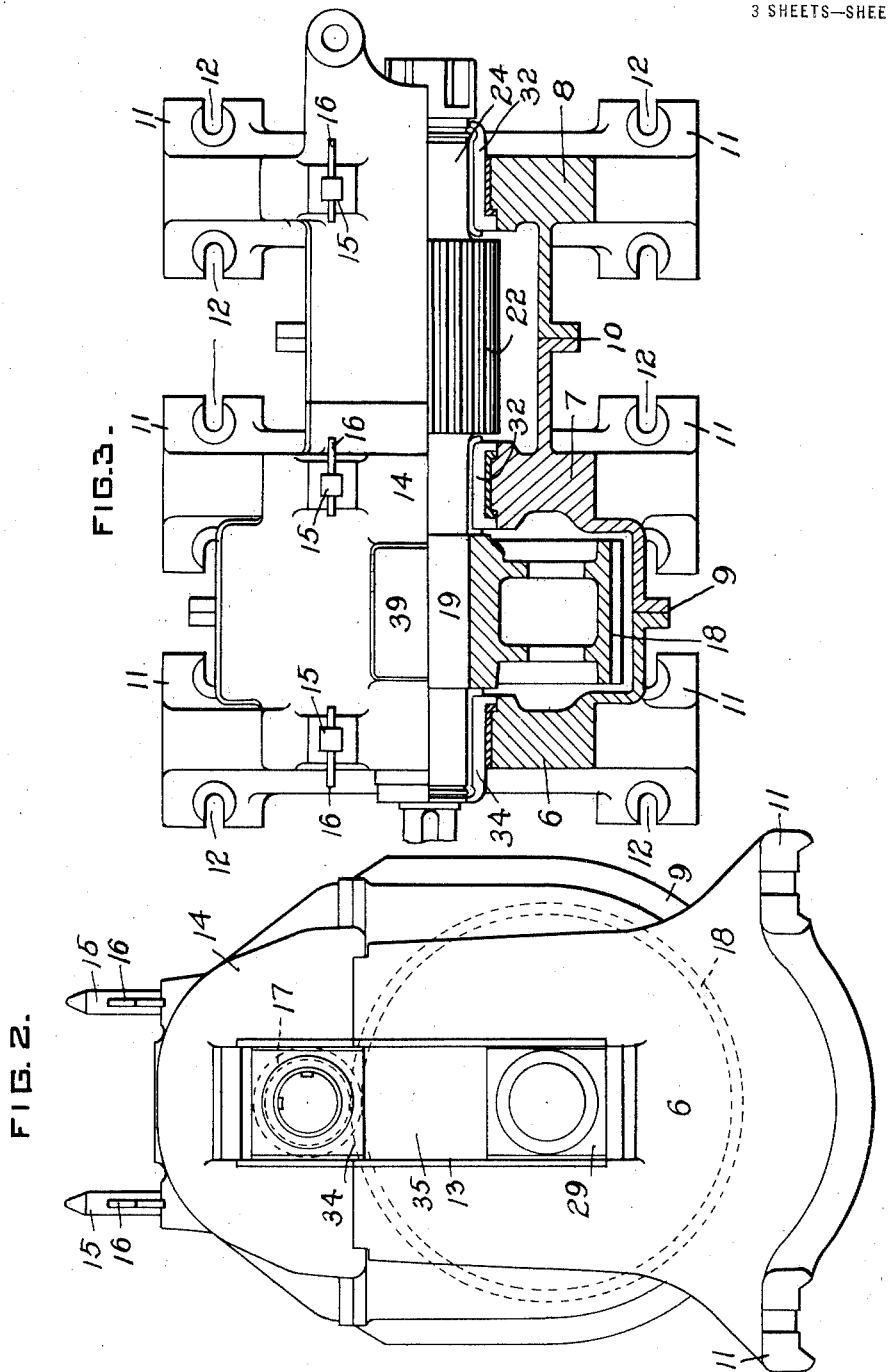

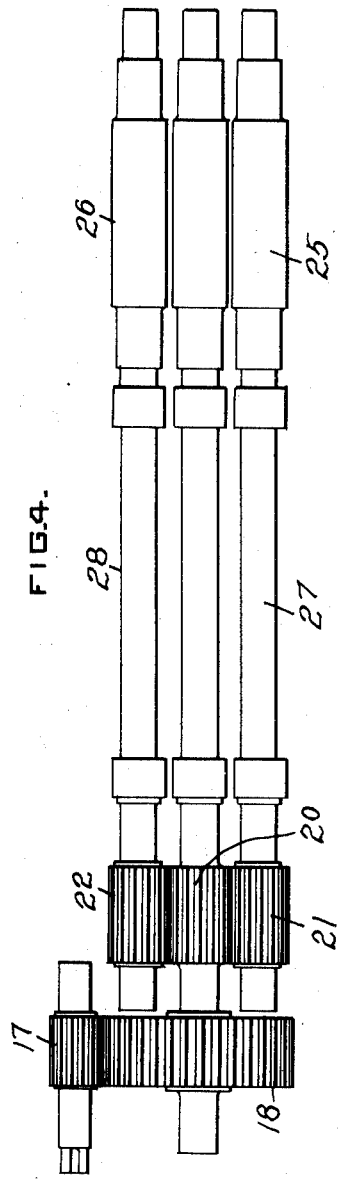
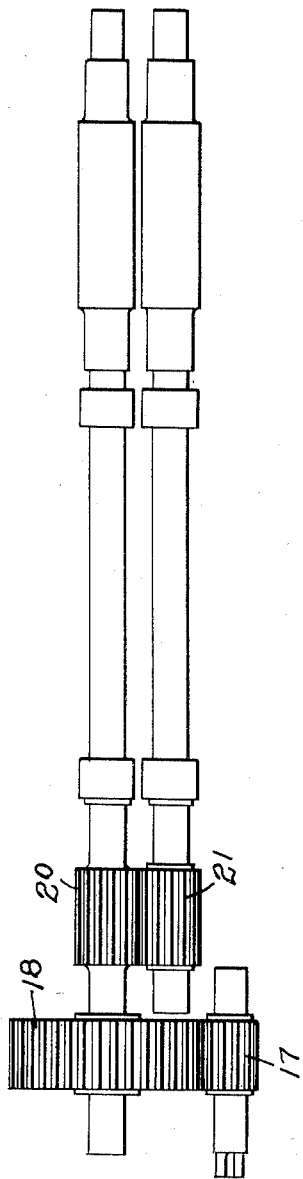

UNITED STATES PATENT OFFICE.

LORENZ IVERSEN, OF PITTSBURGH, PENNSYLVANIA.

GEAR-DRIVE FOR ROLLING-MILLS.

1,401,260. Specification of Letters Patent. Patented Dec. 27, 1921.

Application filed August 15, 1917. Serial No. 186,272.

*To all whom it may concern:*

Be it known that I, LORENZ IVERSEN, a citizen of the United States, and a resident of Pittsburgh, in the county of Allegheny and State of Pennsylvania, have made a new and useful Invention in Gear-Drives for Rolling-Mills, of which the following is a specification.

This invention relates to gear drives for rolling mills and in certain particulars is applicable to three high plate mills and two and three high rolling mills.

An object of this invention is to provide a compact gear drive for such mills in which all of the gears are so arranged within a single housing that a greater speed reduction between the driving and driven members can be obtained than has heretofore been possible with any construction known to me.

A further object is to provide an arrangement of gears and a housing for the same by means of which the gears may be quickly and readily assembled within the housing and removed therefrom for replacement or repairs. These as well as other objects, which will readily appear to those skilled in this art, I obtain by means of the construction described in the specification and illustrated in the drawings accompanying and forming a part of the same and throughout which similar elements are denoted by like characters.

In the drawings, Figure 1 is a view combining a sectional elevation of the gear drive for a three high plate mill and a diagrammatic illustration of a portion of such mill. Fig. 2 is a view in end elevation of the gear and its housing illustrated in Fig. 1. Fig. 3 is a view partially in plan and partially in longitudinal section of the gear drive and its housing as illustrated in Fig. 1, and Figs. 4 and 5 are diagrammatic illustrations of a three high rolling mill and a two high rolling mill respectively.

The housing for the gear drive is preferably cast in three sections 6, 7 and 8, having their abutting faces 9 and 10 planed and bolted together. Each section is provided with a base portion having feet 11 formed with slots 12 through which bolts (not shown) will extend for securing the base to the proper foundation.

Each upright portion of the housing is provided with a vertically extending slot 13 within which the bearings for the gear members are located and which are securely held by a cover plate 14 secured to the housing by means of slotted studs 15 and wedge blocks 16 as is now common practice.

The gear set shown in Figs. 1, 2 and 3 consists of a driving pinion 17 to the outer end of the shaft of which a suitable motor for driving the mill through the gearing will be connected. Drive pinion 17 meshes with a gear 18 mounted on shaft 19 which is preferably an extension of pinion 20. Pinion 20 in turn meshes with two gears 21 and 22 to the shaft ends 23 and 24 of which bottom and top rolls 25 and 26 of the three high plate mill are respectively connected by means of suitable flexible shafts 27 and 28 of the usual construction.

Bearing 29 for the outer end of shaft 19 of pinion 20 lies in the bottom of slot 13 in one end of the housing while bearings 30 for pinion 20 rest on bearings 31 for pinion 21. Bearings 32 for pinion 22 rest on bearings 30. The bearing for one end of the shaft of pinion 17 rests on bearings 32, while the bearing 34 for the other end of the shaft rests on a spacing block 35 which in turn rests on bearing 29.

The several bearings after being shimmed for proper alinement of the shafts are held rigidly in place by means of tapered wedge blocks 36 which lie between the upper face of the upper bearings and the lower machined surface of the cover plate. These wedges are drawn home by means of suitable U bolts 37 and nuts 38. The U bolt above end bearing 32 can be reached from the outside of the housing and the U bolts above bearings 33 and 34 can be reached through the man-hole closed by cover 39.

Herring bone gears are preferably used in connection with this invention but I do not wish the invention to be restricted to the use of herring bone gears. If it is found desirable for any reason, the driving pinion 17 can be located below or at the side of gear 19.

In a two high mill, such as diagrammatically illustrated in Fig. 5, either pinion 21 or 22 can be omitted in which case pinion 20 and the pinion meshing therewith will be of the same size. In a three high mill, such as diagrammatically illustrated in Fig. 4, in which all three rolls are driven, the pinions 20, 21 and 22 will be of the same size. It will be understood that in either of the forms illustrated in Figs. 4 and 5 the driving pinion 17 may be located at the bottom of the gear 18, or at the side thereof, or in fact at any convenient point in the periphery of gear 18.

In accordance with the provisions of the patent statutes I have described the principle of the operation of my invention, together with the device and modification thereof which I now consider to represent the best embodiments thereof, but I desire to have it understood that the devices shown are only illustrative and that the invention can be carried out in other ways.

Having thus described my invention, what I claim as new and desire to secure by Letters Patent is—

1. A gear train for a rolling mill comprising in combination vertically spaced roll driving gears, a shaft, a driving pinion mounted thereon and meshing with said gears, and alined therewith, a reduction gear mounted on said shaft, a driving pinion meshing with said reduction gear, bearings at each side of each of said gears and pinions, the bearings of vertically alined gears and pinions being superimposed, and a single retaining element for said superimposed bearings.

2. In combination in a driving gearing for a rolling mill, a gear housing formed in three separate parts, each part having a vertical bearing receiving slot formed therein, a driving pinion, a reduction gear meshing therewith, a roll driving pinion rigidly secured to said reduction gear, vertically alined roll driving gears meshing with said last-mentioned pinion, bearing blocks located on each side of each of said gears and pinions, each block being located in the bearing receiving slot of one of said housing parts in superimposed relation with other blocks in said housing and a single block-retaining means for retaining all said blocks in place in said slots.

3. In combination in a driving gearing for a rolling mill, a housing formed in three parts each having a vertical bearing receiving slot formed therein, a driving gear, a roll driving pinion axially alined therewith, and rigidly secured thereto, a driving pinion meshing with said gear, and vertically alined therewith, a roll driving gear meshing with said roll driving pinion and vertically alined therewith, separate bearing blocks located on each side of each of said gears and pinions, said blocks being mounted in superimposed relation in the separate slots of the separate parts of the housing, and a single retaining means associated with the slots for holding the blocks mounted therein in place.

In testimony whereof, I have hereunto subscribed my name this 7th day of August, 1917.

LORENZ IVERSEN.

Witnesses:
E. B. MOLTER,
EMMA LEA MONTGOMERY.